United States Patent
Morgan

(10) Patent No.: US 8,388,225 B2
(45) Date of Patent: Mar. 5, 2013

(54) ULTRAVIOLET OUTPUT STABILIZATION BY FLUORESCENT BULB TEMPERATURE MONITORING

(75) Inventor: Courtney Flem Morgan, Alpharetta, GA (US)

(73) Assignee: Novartis AG, Basel (CH)

( * ) Notice: Subject to any disclaimer, the term of this patent is extended or adjusted under 35 U.S.C. 154(b) by 651 days.

(21) Appl. No.: 12/411,557

(22) Filed: Mar. 26, 2009

(65) Prior Publication Data

US 2009/0243492 A1   Oct. 1, 2009

Related U.S. Application Data

(60) Provisional application No. 61/072,540, filed on Apr. 1, 2008.

(51) Int. Cl.
*G01K 7/00* (2006.01)
*G01K 1/00* (2006.01)
*G01K 13/00* (2006.01)

(52) U.S. Cl. .......................... 374/163; 374/141; 374/142

(58) Field of Classification Search .................. 374/141, 374/163, 142
See application file for complete search history.

(56) References Cited

U.S. PATENT DOCUMENTS

| 4,396,872 | A | 8/1983 | Nutter | 315/308 |
|---|---|---|---|---|
| 4,694,223 | A | 9/1987 | Campolo | 315/118 |
| 4,922,078 | A | 5/1990 | Ulrich et al. | 219/216 |
| 5,097,136 | A | 3/1992 | Meyer et al. | 250/492.1 |
| 6,174,155 | B1 * | 1/2001 | Buazza et al. | 425/143 |
| 6,228,289 | B1 * | 5/2001 | Powers et al. | 264/1.36 |
| 2008/0164824 | A1 | 7/2008 | Imberti et al. | 315/151 |

FOREIGN PATENT DOCUMENTS

WO   WO 98/28126   7/1998

OTHER PUBLICATIONS

PCT International Search Report.
PCT Written Opinion of the International Searching Authority.

* cited by examiner

*Primary Examiner* — Lisa Caputo
*Assistant Examiner* — Mirellys Jagan
(74) *Attorney, Agent, or Firm* — Sheng-Hsin Hu

(57) ABSTRACT

A controller measures a temperature at which an ultraviolet (UV) fluorescent lamp is operating and, in response, controls heat transfer between a heat-generating portion of the fluorescent lamp power supply circuitry, such as the ballast, and the interior of the curing chamber to maintain the fluorescent lamps operating at a stable temperature.

8 Claims, 3 Drawing Sheets

ULTRAVIOLET OUTPUT STABILIZATION BY FLUORESCENT BULB TEMPERATURE MONITORING

This application claims the benefit under 35 U.S.C. §119(e) of U.S. provisional application Ser. No. 61/072,540 filed Apr. 1, 2008, herein incorporated by reference in its entirety.

TECHNICAL FIELD OF THE INVENTION

The invention relates generally to manufacturing processes, such as contact lens manufacturing, in which one or more polymer-based workpieces, such as contact lenses, are subjected to ultraviolet (UV) radiation to cross-link the polymer. More specifically, the invention relates to stabilizing the intensity of the radiation by controlling UV lamp temperature.

BACKGROUND OF THE INVENTION

In most manufacturing processes, it is generally desirable to control as many variables as practical, so as to maintain product consistency, maximize throughput, and provide other advantages. For example, in a heat-curing process in which a product is conveyed through an oven, oven temperature is generally controlled by monitoring oven temperature and feeding back a temperature signal to a controller, which adjusts the oven heat source.

As illustrated in FIG. 1, in conventional manufacturing of soft (hydrophilic polymer) contact lenses, a liquid polymer material is injected into molds 10, which are then transported on a conveyer belt 12 through a curing chamber 14. Tube-shaped fluorescent lamps 16 that emit ultraviolet (UV) radiation are mounted in curing chamber 14. Subjecting molds 10 to UV radiation as they pass through curing chamber 14 cross-links and thus toughens the polymer. Although lamps 16 are shown mounted only above conveyer belt 12 for purposes of illustration, it should be recognized that a conventional curing chamber can include lamps 16 mounted in various positions, including some lamps 16 above conveyer belt 12 and others below conveyer belt 12, to more evenly expose molds 10 to the UV light. Curing chamber 14 is sometimes referred to in the art as an oven, though the primary source of the curing effect is UV light rather than heat.

Lamps 16 are powered through power supply circuitry 18 that includes ballast 20. As a fluorescent lamp 16 is a negative-resistance device, i.e., its resistance drops as more current flows (thus allowing still more current to flow), ballast 20 is needed to moderate the current through the tube. Although some types of ballasts for fluorescent lamps can include active electronics, such as power transistors and digital circuitry, ballast 20 can be as straightforward as a single inductor or capacitor. Ballasts 20 are conventionally mounted on or in the same fixtures 22 in which lamps 16 are mounted. As ballasts 20 produce waste heat, a blower or fan 24 is included in chamber 14 to draw cooling air through chamber 14 and prevent over-heating. Although ballasts 20 are shown in FIG. 1 for purposes of illustration as being exposed (to the interior of chamber 14), in other conventional curing chamber arrangements the ballasts may be enclosed inside the fixtures and thus somewhat more thermally isolated from the interior of chamber 14. In such an arrangement, the ballast-generated heat may be conducted through the fixture walls into the chamber.

When power supply circuitry 18 energizes an electrode (not separately shown) in each lamp 16, the electrical energy emitted at the electrodes excites the gas with which the lamp tube is filled, causing it to transform to a plasma state. The plasma produces short-wave UV light. The interior of each lamp tube is coated with a phosphor. The UV excites the phosphor, causing it to fluoresce and thus produce visible light. The relative proportions of UV light and visible light emitted from the tube are functions of the phosphor material and the tube's transmissibility (i.e., tubes can incorporate filters or be made from doped glass). Lamps 16 that are to be used primarily as sources of UV light have a phosphor that promotes emission of a substantial proportion of UV light and a lesser proportion of visible light. As much of this visible light is close to UV, lamps 16 generally can be observed as emitting a purple or violet light. Such UV lamps 16 are used not only in industrial curing chambers but also to illuminate artwork or other ornamental objects having surfaces that fluoresce when exposed to UV light. Indeed, the same UV lamps 16 are typically used in both industrial curing and ornamental illumination applications, as they have generally been deemed adequate for both applications.

The light intensity or power emitted by a fluorescent lamp is generally believed in the prior art to be stable and constant, once the lamp has warmed up to a stable operating temperature. (Power, also referred to as intensity, is typically quantified in such an instance in units of milliwatts per square centimeter.) For example, manufacturers of lamps 16 generally specify that each lamp 16 will emit UV radiation (also referred to herein as UV light) at a specified intensity (mW/$cm^2$) when operated at a specified voltage and temperature. It is generally believed in the art that lamps 16 should optimally be allowed to operate for about 20-30 minutes, thereby allowing chamber 14 to warm up somewhat, before beginning to convey molds 10 through chamber 14. As fluorescent lamps do not themselves generate much heat, the warming of chamber 14 is primarily due to heat generated by ballasts 20.

Once chamber 14 has been warmed up, and molds 10 begin passing through chamber 14, it generally has been presumed that the UV light that impinges upon molds 10 as they pass through chamber 14 is sufficient to effect curing, and little further control is exercised over the curing chamber process other than to maintain conveyer belt 12 at a substantially constant speed and lamps 16 at a substantially constant voltage. As ballasts 20 can become quite warm, fan 24 is typically continuously operated to continuously draw air through chamber 14 and thereby minimize the likelihood of overheating. Such airflow is indicated by heavy arrows in FIG. 1, with air entering chamber 14 at intake ports adjacent conveyer belt 12 and exiting or exhausting through fan 24. As noted above, the arrangement shown in FIG. 1 is intended only to be exemplary of a conventional UV curing chamber of the type used in contact lens manufacturing, and other arrangements are also known.

SUMMARY OF THE INVENTION

The invention relates to a system and method for controlling ultraviolet (UV) fluorescent lamp temperature in a curing chamber having one or more UV fluorescent lamps and associated power supply circuitry. The power supply circuitry includes ballast and can other elements relating to applying power to a UV fluorescent lamp, such as transformer. A controller measures a temperature in at least one portion of the process chamber interior. For example, it can read a temperature probe exposed to the ambient internal environment in the process chamber or a temperature probe mounted on the surface of a UV lamp. The controller compares the measured temperature with one or more predetermined temperatures and, in response to the comparison, controls heat transfer from heat-generating portions of the power supply circuitry (e.g., ballast) to the interior of the process chamber. For example, the controller can control suitable types of air flow control devices, such as fans, air valves, air mixers, etc., to draw air that has been heated by the ballast through the process chamber, either directly or first mixing such air with ambient external air to adjust its temperature.

By controlling heat transfer between the process chamber interior and external environment, the invention controls the temperature of the fluorescent lamps, thereby promoting emission of light at a stable or constant intensity. Stable lamp temperature can also promote long lamp life and provide other advantages.

DETAILED DESCRIPTION OF AN ILLUSTRATIVE EMBODIMENT

Figure 1:
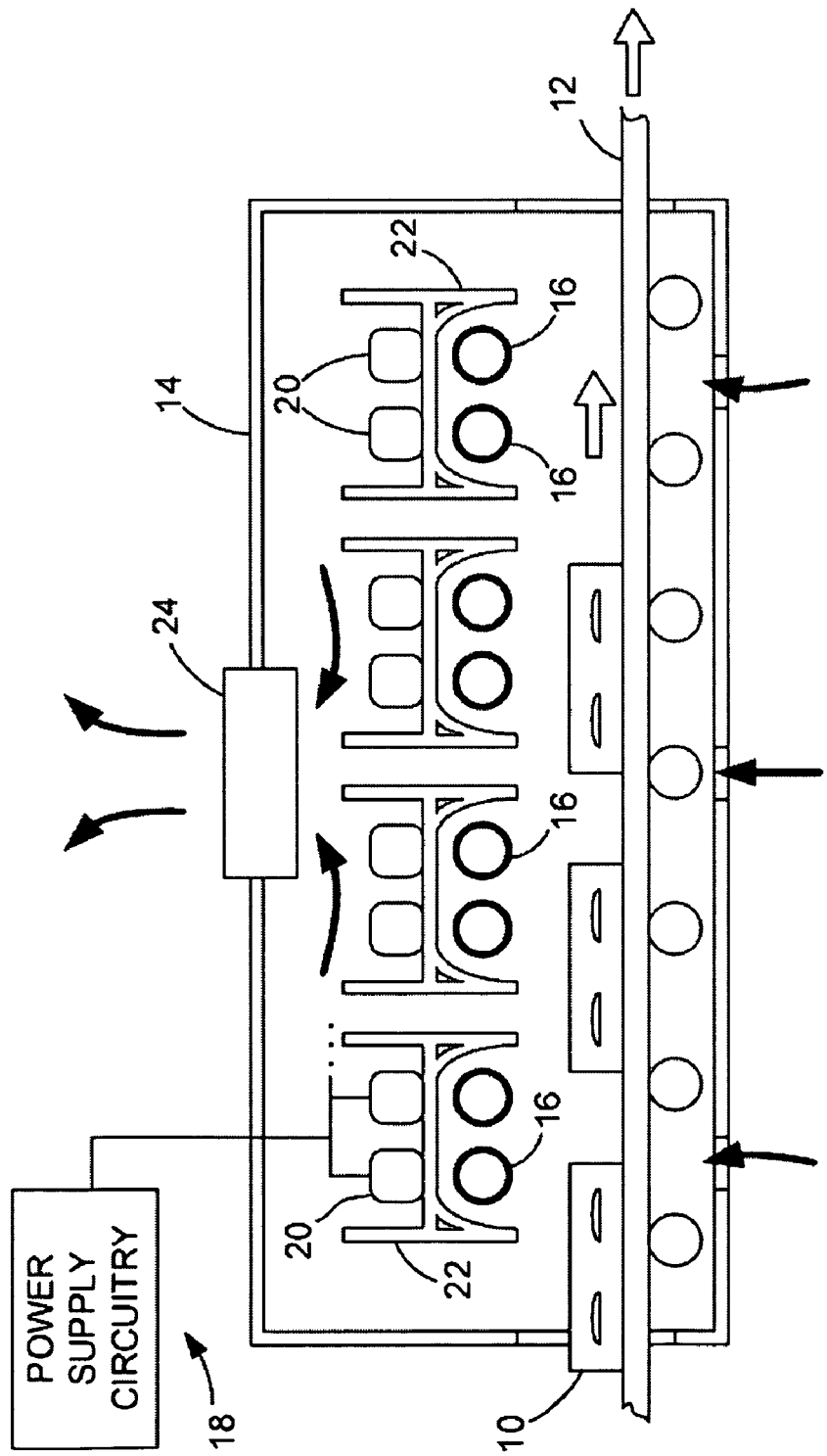
FIG. 1 is a side view of the interior of a conventional ultraviolet curing chamber for contact lens manufacturing.
Figure 2:
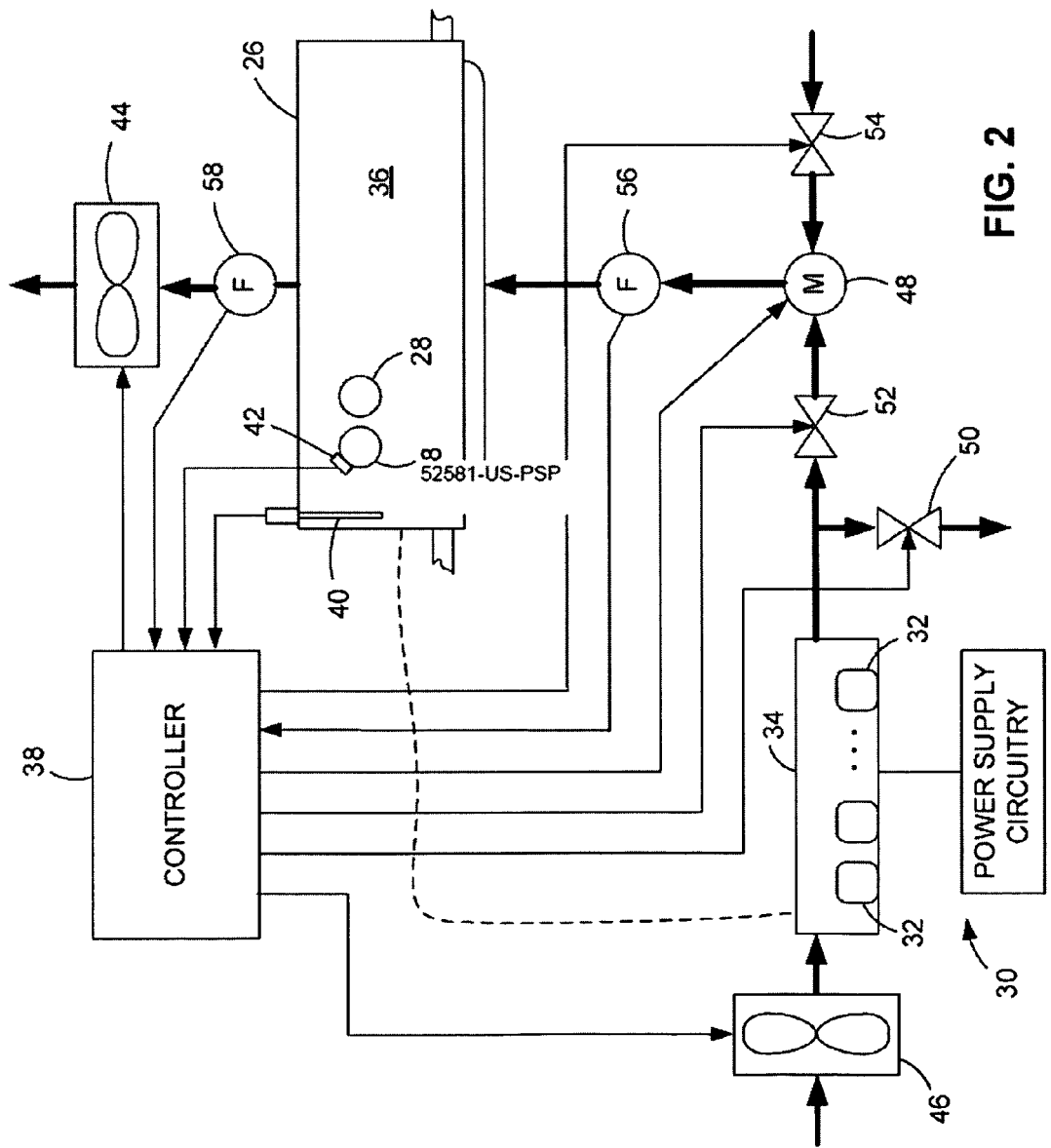
FIG. 2 is a diagrammatic view of a system having a temperature-controlled ultraviolet curing chamber in accordance with an exemplary embodiment of the present invention.

As illustrated in FIG. 2, in an illustrative or exemplary embodiment of the invention, a curing chamber 26 of the type described above with regard to FIG. 1 is used in manufacturing contact lenses. Accordingly, tube-shaped UV fluorescent lamps 28 (not all of which are shown for purposes of clarity) are mounted in curing chamber in the conventional manner and energized through conventional power supply circuitry 30. In the exemplary embodiment, however, the ballasts 32 of power supply circuitry 30 are mounted in an enclosure 34 disposed outside, i.e., external to, chamber 26, to thermally isolate ballasts 32 from the interior 36 of chamber 26. The electrical connections between ballasts 32 and lamps 28 are indicated in broken line.

An electronic controller 38, which can be of any suitable type commonly used for controlling heating or cooling or similar industrial processes, is programmed or configured in accordance with the invention to maintain the interior 36 of chamber 26 at a stable or constant temperature by controlling heat transfer between the interior 36 and one or more heat sources or sinks. More specifically, heat generated by ballast 34 is transferred into and out of the interior 36 of chamber 26 in a controlled manner, as described in further detail below.

There is an optimal temperature or relatively narrow range of temperatures at which lamps 28 can be operated to emit a maximal or otherwise optimal intensity of UV light. If a lamp 28 is operated at a lower or higher temperature, it can emit less than optimal intensity. In a conventional system, as the chamber (and thus the lamps) warm up, they approach this optimal temperature range. However, chamber temperature can be affected by load, i.e., the quantity of molds in the chamber (and the temperature of the molds as they enter), the ambient temperature of the environment (e.g., factory floor) in which the chamber is disposed, and other factors. Also, it has been recognized in accordance with the invention that as the fan in a conventional system runs in an uncontrolled, continuous manner it can potentially cool the lamps below the optimal temperature range. Thus, it is possible in a conventional system for the chamber to become heated above the optimal temperature range or to fall short of the optimal temperature range. The chamber temperature can also fluctuate significantly among the various batches of lenses that pass through the chamber over the course of the number of hours, days, months, etc., that the manufacturing line is in operation. It is possible for such fluctuation to adversely affect product consistency. The invention addresses these problems by transferring heat from ballasts 34 to lamps 28 in a controlled manner to thereby maintain the lamp temperature in the optimal range.

One or more temperature probes, such as a thermocouple probe 40 and surface-mounted probe 42, are mounted in suitable portions of the interior 36 of chamber 26. For example, thermocouple probe 40 can be mounted such that it extends through a port through chamber 26, with its sensing end suspended in the interior 36 to measure the temperature of the air in interior 36. Similarly, surface-mounted probe 42 can be mounted directly to the glass tube surface of a lamp 28 with a suitable adhesive. Other suitable probe locations will occur readily to persons skilled in the art in view of these teachings. As described below in further detail, controller 38 can read these temperature probes and use the measured temperature values as inputs to its temperature control algorithm.

Various air flow control devices, such as blowers or fans 44 and 46, an air flow mixer 48, and air flow valves 50, 52 and 54, are included and are individually electronically controllable by controller 38. Fan 44 is coupled to an air exhaust port of chamber 26, and fan 46 is coupled via a number of other air flow control devices to an air intake port of chamber 26. Controller 38 thus can adjust the speeds of fans 44 and 46 to adjust the air flow velocity through ballast enclosure 34 and chamber 26. Fan 46 draws air from the ambient environment through ballast enclosure 34, where the heat generated by ballasts 32 is transferred to the air flowing through enclosure 34. Controller 38 can control air flow valves 50 and 52 to adjust the proportion of ballast-heated air that is to be discharged to the ambient environment through valve 50 and ballast-heated air that is to be passed through to chamber 26. Controller 38 can also control air flow valve 54 and air flow mixer 48 to mix the ballast-heated air that is to be passed through to chamber 26 with additional air drawn from the ambient environment through valve 54. Controller 38 can read a flow meter 56 disposed between mixer 48 and the air intake port of chamber 26 to determine the air flow volume entering chamber 26 and read another flow meter 58 disposed between the air exhaust port of chamber 26 and the fan 44 to determine the air flow volume exiting chamber 26. Controller 38 can use these air flow volume measurements as additional inputs to its temperature control algorithm, in a manner well understood by persons skilled in the art.

Figure 3:
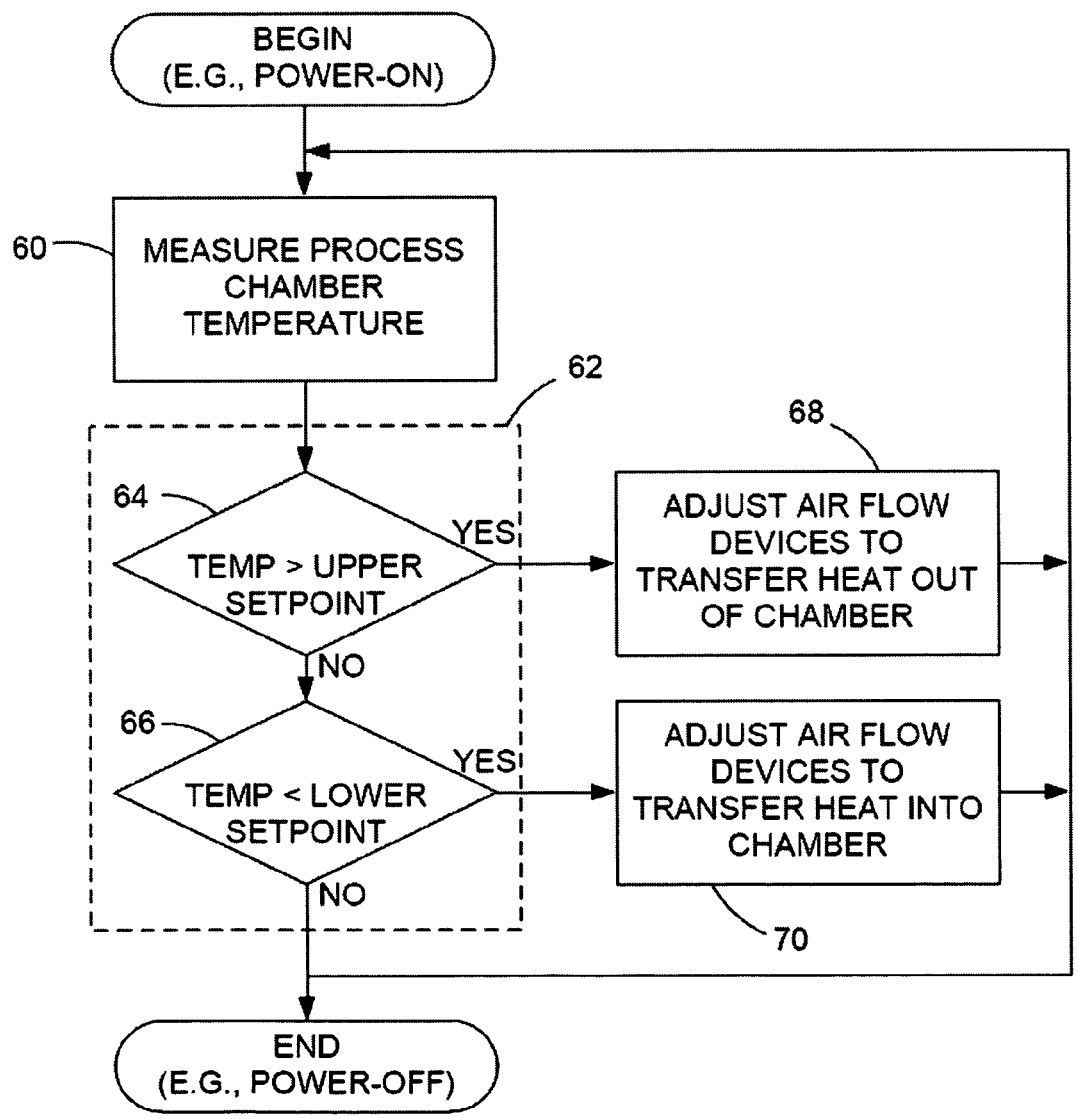
FIG. 3 is a flow diagram, showing a method of operation of the system of FIG. 2.

An exemplary temperature control method is illustrated in FIG. 3. In view of the teachings herein, persons skilled in the art are readily capable of programming or configuring controller 38 to effect this method. The method can begin when the system (e.g., power supply circuitry 30) is powered on. Controller 38 and other active elements of the system are thus also powered on. As indicated by step 60, controller 38 reads one or more of temperature probes 40 and 42 to obtain a measurement that is representative of the temperature of lamps 28. As indicated by step 62, controller 38 compares the measured temperature with one or more predetermined setpoint temperatures, such as upper and lower temperatures of a range within which it is desired to maintain the temperature in chamber 26. For example, controller 38 can determine whether the measured temperature is greater than an upper setpoint temperature, as indicated by step 64, or determine whether the measured temperature is less than a lower setpoint temperature, as indicated by step 66. If the measured temperature is greater than the upper setpoint temperature, then controller 38 can adjust one or more of the air flow control devices to promote cooling of the air in the interior 36 of chamber 26, i.e., transfer of heat out of chamber 26 and into the ambient environment, which acts as a heat sink, as indicated by step 68. For example, controller 38 can adjust air flow mixer 48 to increase the amount of ambient air, which is cooler than the ballast-heated air that it mixes with the ballast-heated air. Alternatively or in addition, controller 38 can decrease the volume or velocity of warmer air passed through the interior 36 by adjusting air flow valves 50, 52 and 54 or fans 44 and 46. If the measured temperature is less than the lower setpoint temperature, then controller 38 can adjust one or more of the air flow control devices to promote heating of the air in the interior 36 of chamber 26, i.e., transfer of heat from ballasts 32 into chamber 26, as indicated by step 70. For example, controller 38 can adjust air flow mixer 48 to increase the ratio of ballast-heated air to ambient air. Alternatively or in addition, controller 38 can increase the volume or velocity of warmer air passed through the interior 36 by adjusting air flow valves 50, 52 and 54 or fans 44 and 46.

Following the above-described steps, the control loop returns to step 60. Controller 38 can exit the control loop when the system (e.g., power supply circuitry 30) is powered off or manually overridden by an operator. Note that the method shown in FIG. 3 is intended only to be exemplary, and persons skilled in the art recognize that other suitable temperature control methods can be used. Indeed, various sophisticated methods that are capable of very precise control, such as the proportional-integral-derivative (PID) method, are well known in the art.

It should be noted that the invention has been described with reference to one or more exemplary embodiments for the purpose of demonstrating the principles and concepts of the invention. The invention is not limited to these embodiments. For example, although in the exemplary embodiment the invention is used in manufacturing contact lenses, in other embodiments the invention can be used for any other suitable purpose in which it is desirable to achieve stable UV lamp intensity in a curing chamber or similar enclosed space. As will be understood by persons skilled in the art, in view of the description provided herein, variations may be made to the embodiments described herein, and all such variations are within the scope of the invention.

What is claimed is:

1. An ultraviolet output-controlled fluorescent lamp system, comprising:
    a curing chamber having an interior, an air intake and an air exhaust;
    at least one UV fluorescent lamp mounted in the interior of the curing chamber;
    power supply circuitry, the power supply circuitry comprising heat-generating ballast, the heat-generating ballast being mounted in an enclosure external to the curing chamber and thermally isolated from the interior of the curing chamber;
    at least one temperature probe disposed in at least one portion of the curing chamber; and
    at least one air flow control device coupled to at least one of the air intake and air exhaust;
    a temperature controller, the temperature controller being capable of reading the temperature probe to measure a temperature in the curing chamber, of performing a comparison between the measured temperature and a predetermined temperature, and in response to the comparison of controlling the at least one air flow control device to control heat transfer from the enclosure of the heat-generating ballast to the interior of the curing chamber and out of the curing chamber.

2. The system of claim 1, wherein the temperature probe is exposed to an ambient internal environment inside the curing chamber.

3. The system of claim 1, wherein the temperature probe is exposed to a surface of the UV fluorescent lamp.

4. The system of claim 1, wherein the at least one air flow control device includes an air mixer, and wherein the temperature controller is capable of controlling mixing of air heated by the heat-generating ballast comprised by the power supply circuitry with air extracted from the ambient external environment by controlling the air mixer.

5. The system of claim 1, wherein the temperature controller is capable of controlling a flow of air heated by the heat-generating ballast comprised by the power supply circuitry through the interior of the curing chamber.

6. The system of claim 5, further comprising a flow meter coupled to at least one of the air intake and air exhaust, wherein the temperature controller is capable of reading the flow meter and of controlling the at least one air flow control device at least partly in response to the flow meter reading.

7. The system of claim 5, wherein the at least one air flow control device includes a fan, and wherein the temperature controller is capable of controlling a flow of air heated by the heat-generating ballast comprised by the power supply circuitry by controlling the fan.

8. The system of claim 5, wherein the at least one air flow control device includes an air valve, and wherein the temperature controller controls is capable of controlling a flow of air heated by the heat-generating ballast comprised by the power supply circuitry by controlling the air valve.

* * * * *